United States Patent
Furuya et al.

(10) Patent No.: US 9,601,799 B2
(45) Date of Patent: Mar. 21, 2017

(54) METHOD FOR PRODUCING POSITIVE ELECTRODE OF THIN-FILM BATTERY AND METHOD FOR PRODUCING THIN-FILM BATTERY

(75) Inventors: Tatsuya Furuya, Kanagawa (JP); Katsunori Takahara, Kanagawa (JP); Hiroyuki Morioka, Kanagawa (JP); Yuichi Sabi, Tokyo (JP)

(73) Assignee: Sony Corporation, Tokyo (JP)

( * ) Notice: Subject to any disclaimer, the term of this patent is extended or adjusted under 35 U.S.C. 154(b) by 611 days.

(21) Appl. No.: 13/003,325

(22) PCT Filed: Jun. 26, 2009

(86) PCT No.: PCT/JP2009/062163
§ 371 (c)(1),
(2), (4) Date: Jan. 10, 2011

(87) PCT Pub. No.: WO2010/007899
PCT Pub. Date: Jan. 21, 2010

(65) Prior Publication Data
US 2011/0162972 A1    Jul. 7, 2011

(30) Foreign Application Priority Data
Jul. 16, 2008 (JP) ................. P2008-185287

(51) Int. Cl.
*H01M 4/1391* (2010.01)
*H01M 10/0525* (2010.01)
(Continued)

(52) U.S. Cl.
CPC ..... *H01M 10/0436* (2013.01); *H01M 4/1391* (2013.01); *H01M 10/0525* (2013.01);
(Continued)

(58) Field of Classification Search
USPC .................................................. 205/209, 59
See application file for complete search history.

(56) References Cited

U.S. PATENT DOCUMENTS 3,953,234 A * 4/1976 Hoffmann ..................... 429/199
5,225,297 A * 7/1993 Garcia-Alvarado et al. . 429/220
(Continued)

FOREIGN PATENT DOCUMENTS

JP    10-255987    * 9/1998 ............. H05B 33/26
JP    2001-011611    1/2001
(Continued)

OTHER PUBLICATIONS

Wu, C., et al., "Spectroscopic studies on cation-doped spinel LiMn2O4 for lithium ion batteries", Solid State Ionics, 2001, 144, p. 277-285.*

(Continued)

*Primary Examiner* — Stefanie S Wittenberg
(74) *Attorney, Agent, or Firm* — K&L Gates LLP

(57) ABSTRACT

A method for producing a thin-film battery includes a film-formation step of forming a film of a positive-electrode material to form a positive-electrode active material film and an annealing step of annealing the positive-electrode active material film. After the annealing step, a lithium-ion introduction step of introducing lithium ions into the positive-electrode active material film. After the introduction of the lithium ions, a reverse-sputtering step of edging the positive-electrode active material film by reverse sputtering.

5 Claims, 11 Drawing Sheets

(51) Int. Cl.
   *H01M 10/0585* (2010.01)
   *H01M 10/04* (2006.01)
   *H01M 6/40* (2006.01)

(52) U.S. Cl.
   CPC .......... *H01M 10/0585* (2013.01); *H01M 6/40* (2013.01); *Y02E 60/122* (2013.01); *Y02P 70/54* (2015.11)

(56) References Cited

U.S. PATENT DOCUMENTS

| | | | |
|---|---|---|---|
| 5,591,548 A * | 1/1997 | Mao | 429/223 |
| 5,759,715 A * | 6/1998 | Barker et al. | 429/331 |
| 5,871,863 A * | 2/1999 | Miyasaka | 429/218.1 |
| 6,071,646 A * | 6/2000 | Noguchi et al. | 429/224 |
| 6,242,129 B1 * | 6/2001 | Johnson | H01M 4/366 429/162 |
| 6,376,027 B1 | 4/2002 | Lee et al. | |
| 2007/0292759 A1 * | 12/2007 | Ugaji et al. | 429/223 |

FOREIGN PATENT DOCUMENTS

| | | |
|---|---|---|
| JP | 2001-316817 | 11/2001 |
| JP | 2005-235686 | 9/2005 |
| JP | 2006-216336 | 8/2006 |

OTHER PUBLICATIONS

Kellerman, D.G., et al., "Structure, Properties, and Application of Lithium-Manganese Spinels", Russian Journal of Electrochemistry, vol. 37, No. 12, 2001, pp. 1227-1236.*

Kosova, N. V., et al., "Highly Dispersed Materials for Rechargable Lithium Batteries: Mechanochemical Approach" Journal of Structural Chemistry, vol. 45, Supplement, pp. S142-S146, 2004.*

International Search Report dated Aug. 13, 2009, for corresponding Patent Application PCT/JP2009/062163.

* cited by examiner

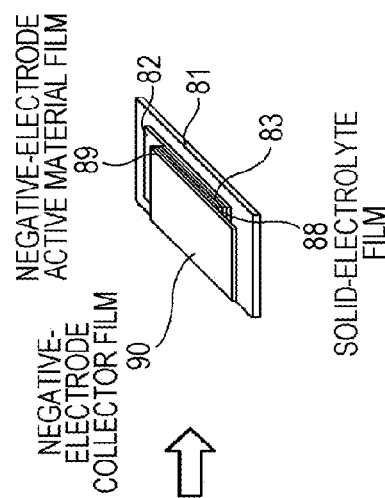
FIG. 7B ANNEALING
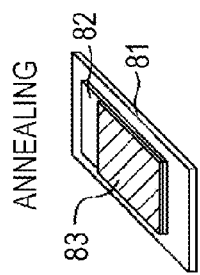
FIG. 7A
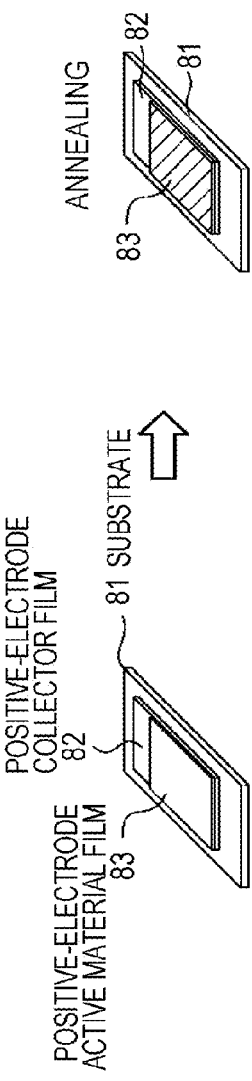
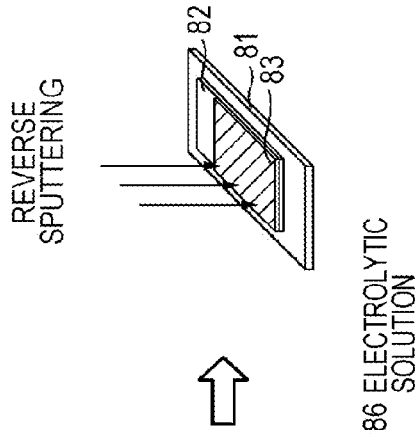
FIG. 7D REVERSE SPUTTERING
FIG. 7E
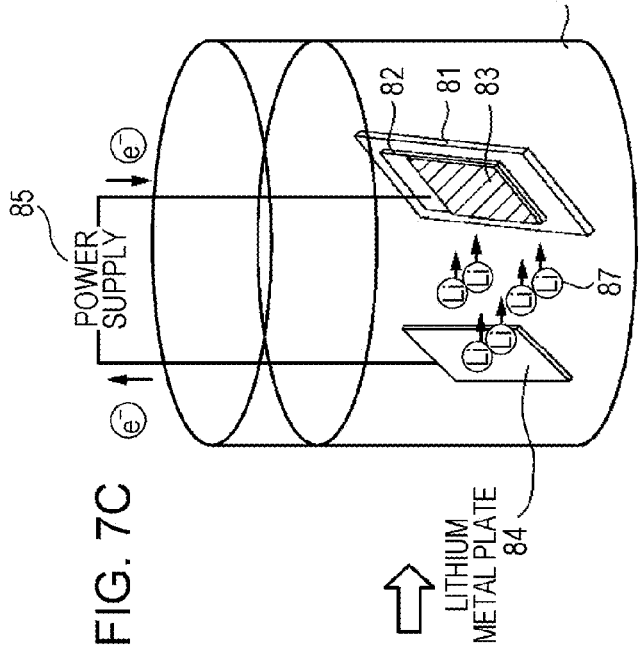
FIG. 7C

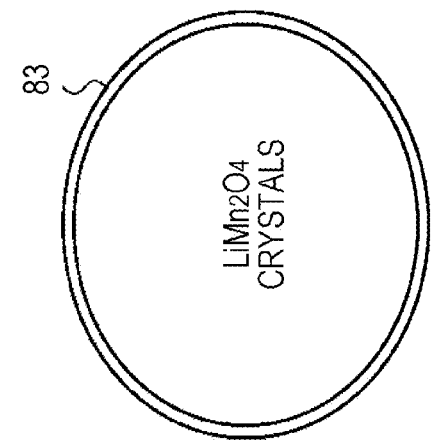
FIG. 8C AFTER INTRODUCTION OF LITHIUM
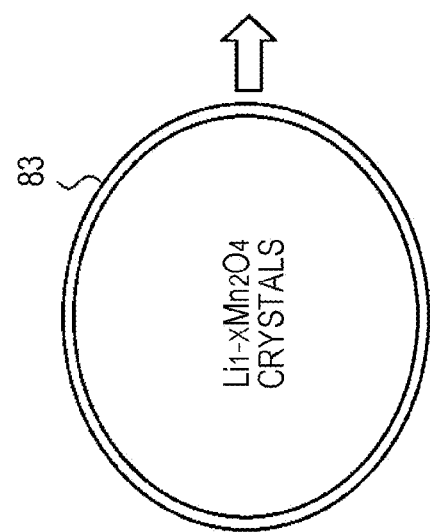
FIG. 8B AFTER ANNEALING
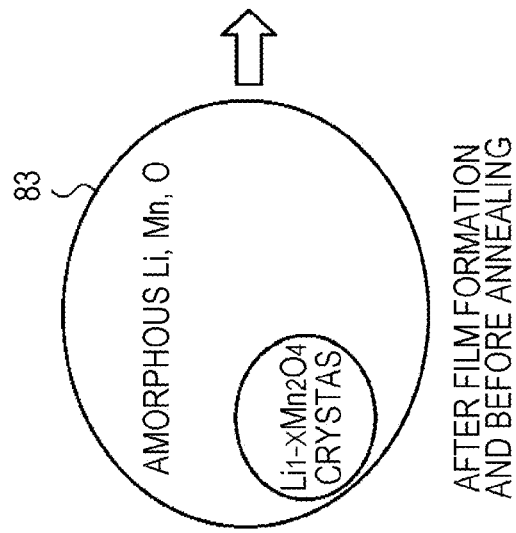
FIG. 8A AFTER FILM FORMATION AND BEFORE ANNEALING FIG. 10A
FIG. 10B
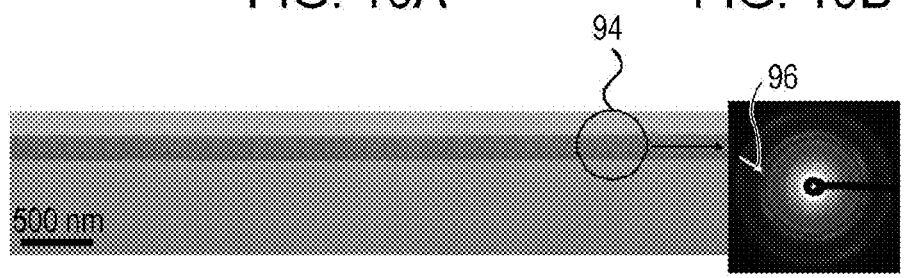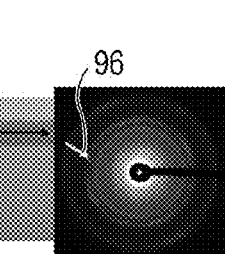
FIG. 10C
FIG. 10D
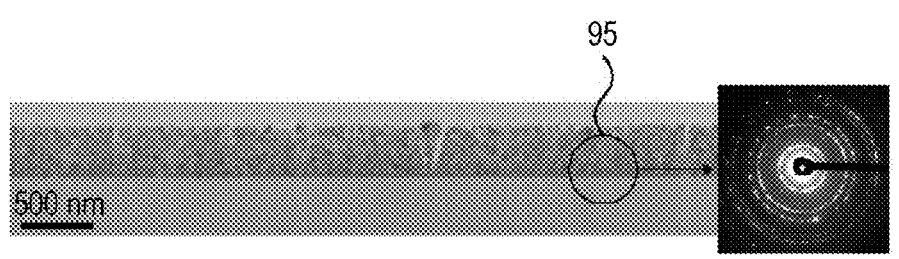

METHOD FOR PRODUCING POSITIVE ELECTRODE OF THIN-FILM BATTERY AND METHOD FOR PRODUCING THIN-FILM BATTERY

CROSS REFERENCE TO RELATED APPLICATIONS

The present application is a National Stage of International Application No. PCT/JP2009/062163 filed on Jun. 26, 2009 and which claims priority to Japanese Patent Application No. 2008-185287 filed on Jul. 16, 2008, the entire contents of which are being incorporated herein by reference.

BACKGROUND

The present disclosure relates to a method for producing a positive electrode of a thin-film battery and a method for producing a thin-film battery. More specifically, the present disclosure relates to a method for producing a positive electrode of a thin-film lithium-ion secondary battery and a method for producing a thin-film lithium-ion secondary battery.

Due to the remarkable developments of mobile electronic technology in recent years, mobile electronic devices such as cellular phones and notebook-type personal computers have come to be recognized as a basic technology supporting the advanced information society. Furthermore, research and development relating to the sophistication of such devices have been actively performed and, in proportion to this, the power consumption of mobile electronic devices has continuously increased. However, such electronic devices are required to operate for a long time, which necessarily demands an increase in the energy density of secondary batteries serving as operation power supplies.

In view of the occupied volume, weight, and the like of batteries contained in mobile electronic devices, the higher the energy density of the batteries is, the more desirable it is. Lithium-ion secondary batteries using doping and dedoping of lithium ions have excellent energy density and hence are widely used for mobile electronic devices.

Among lithium-ion secondary batteries, in thin-film lithium-ion secondary batteries in which the batteries are formed by using the thin-film technology, a further decrease in size and weight can be achieved. Thus, thin-film lithium-ion secondary batteries are expected as power sources for IC cards and small electronic devices.

For example, a thin-film lithium-ion secondary battery described in Japanese Unexamined Patent Application Publication No. 2006-216336 has a configuration in which a positive-electrode collector layer, a positive-electrode active material layer, a solid-electrolyte layer, a negative-electrode active material layer, and a negative-electrode collector layer are stacked on a substrate. As a method for forming the layers (thin films), a sputtering method, CVD, a vacuum deposition method, an electron-beam deposition method, laser ablation, a sol-gel process, or the like is used.

However, thin-film lithium-ion secondary batteries obtained by conventional production methods have a problem of poor utilization efficiency of the positive electrodes.

Accordingly, an object of the present invention is to provide a method for producing a positive electrode of a thin-film battery and a method for producing a thin-film battery in which the utilization efficiency of the positive electrodes can be enhanced.

SUMMARY

Regarding the above-described problems in terms of causes of poor utilization efficiency of the positive electrodes of thin-film batteries, there is (1) poor crystallinity of positive-electrode active material films, and (2) there is a decrease in the amount of lithium in the preparation of sputtering targets and during sputtering.

Accordingly, by overcoming (1) and (2), a method for producing a positive electrode of a thin-film battery and a method for producing a thin-film battery in which the utilization efficiency of the positive electrodes can be enhanced can be provided.

In a first embodiment, a method for producing a positive electrode of a thin-film battery comprises:

a film-formation step of forming a film of a positive-electrode material to form a positive-electrode active material film;

an annealing step of annealing the positive-electrode active material film; and after the annealing step, a lithium-ion introduction step of introducing lithium ions into the positive-electrode active material film.

A second embodiment provides
a method for producing a positive electrode of a thin-film battery comprising:

a film-formation step of forming a film of a positive-electrode material under heating of a substrate to form a positive-electrode active material film; and after the film-formation step, a lithium-ion introduction step of introducing lithium ions into the positive-electrode active material film.

A third embodiment provides
a method for producing a positive electrode of a thin-film battery comprising:

a film-formation step of forming a film of a positive-electrode material under application of a magnetic field to form a positive-electrode active material film; and after the film-formation step, a lithium-ion introduction step of introducing lithium ions into the positive-electrode active material film.

A fourth embodiment provides
a method for producing a thin-film battery including a positive-electrode active material film, a negative-electrode active material film, and an electrolyte film, comprising:

a film-formation step of forming a film of a positive-electrode material to form the positive-electrode active material film;

an annealing step of annealing the positive-electrode active material film; and after the annealing step, a lithium-ion introduction step of introducing lithium ions into the positive-electrode active material film.

A fifth embodiment provides
a method for producing a thin-film battery including a positive-electrode active material film, a negative-electrode active material film, and an electrolyte film, comprising:

a film-formation step of forming a film of a positive-electrode material under heating of a substrate to form the positive-electrode active material film; and after the film-formation step, a lithium-ion introduction step of introducing lithium ions into the positive-electrode active material film.

A sixth embodiment provides
a method for producing a thin-film battery including a positive-electrode active material film, a negative-electrode active material film, and an electrolyte film, comprising:

a film-formation step of forming a film of a positive-electrode material under application of a magnetic field to form the positive-electrode active material film; and after the film-formation step, a lithium-ion introduction step of introducing lithium ions into the positive-electrode active material film.

According to the first to sixth embodiments, in the positive-electrode active material film, the crystallinity is enhanced and lithium whose amount has been decreased is supplied and, as a result, the utilization efficiency of the positive electrode can be enhanced.

Additional features and advantages are described herein, and will be apparent from, the following Detailed Description and the figures.

BRIEF DESCRIPTION OF THE FIGURES

FIGS. 7A to 7E are diagrams for illustrating a method for producing a thin-film lithium-ion battery according to a first embodiment.

FIGS. 8A to 8C are schematic diagrams schematically illustrating variations in the state of a positive-electrode active material film in a method for producing a thin-film lithium-ion battery according to the first embodiment.

FIGS. 10A to 10D illustrate the TEM image and the electron diffraction pattern of a section of a positive-electrode active material film that had been formed and was to be annealed, and the TEM image and the electron diffraction pattern of a section of a positive-electrode active material film that had been annealed.

DETAILED DESCRIPTION

Figure 1:
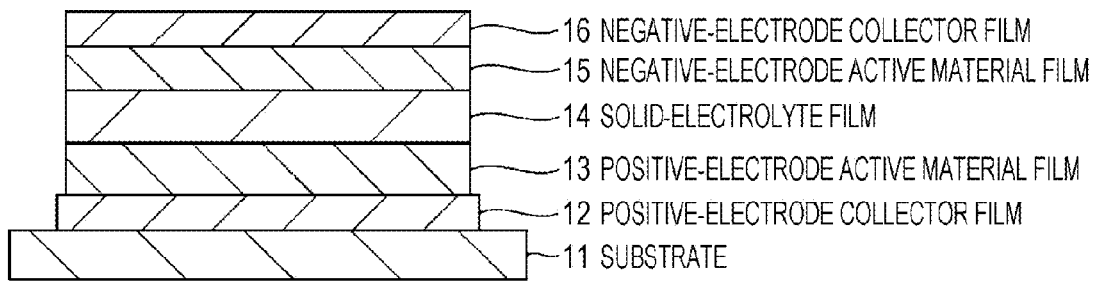
FIG. 1 is a sectional view illustrating the structure of a thin-film lithium-ion battery.

Hereinafter, embodiments will be described with reference to the drawings. FIG. 1 illustrates an example of the sectional structure of a thin-film lithium-ion battery to which a method for producing a thin-film battery according to an embodiment can be applied. This thin-film lithium-ion battery has a structure in which a positive-electrode collector film 12, a positive-electrode active material film 13, a solid-electrolyte film 14, a negative-electrode active material film 15, and a negative-electrode collector film 16 that have the shape of a thin film are sequentially stacked on a substrate 11.

As the substrate 11, for example, a substrate composed of an electrical insulating material such as glass, alumina, or resin; a substrate composed of a semiconductor material such as silicon; a substrate composed of a conductive material such as aluminum, copper, or stainless steel; or the like may be used. The shape of the substrate 11 is not particularly restricted and may be, for example, the shape of a substrate, a sheet, a film, a block, or the like. The substrate 11 may be rigid or flexible and various and a wide range of substrates may be used as the substrate 11.

The positive-electrode collector film 12 is preferably composed of a material having good chemical stability and electrical conductivity. Such a material is, for example, a metal material such as aluminum, nickel, stainless steel, copper, ITO (indium tin oxide), platinum, gold, or silver; or the like.

The positive-electrode active material film 13 is composed of a positive-electrode material that can occlude and release lithium. As the positive-electrode material that can occlude and release lithium, for example, a lithium-transition metal composite oxide that is used for a standard lithium-ion secondary battery is used. Specifically, for example, there is a lithium-manganese composite oxide having a Spinel structure such as $LiMn_2O_4$; a lithium composite oxide having a layered structure such as $LiCoO_2$, $LiNiO_2$, or $Li_xNi_yCo_{1-y}O_2$ (x and y vary in accordance with the charging-discharging state of a battery, and usually satisfy $0<x<1$ and $0.7<y<1.0_2$.); a lithium-phosphate compound having an olivine structure represented by $LiFePO_4$ or the like; or the like. In addition, a solid solution in which a portion of transition metal elements is replaced with another element may be used.

When a lithium composite oxide having a layered structure is used, the layers constituting lithium composite oxide particles are preferably oriented so as to be perpendicular to the surface of the positive-electrode collector film. This is because, since lithium released from the negative electrode upon discharging is inserted between layers of the lithium composite oxide, lithium readily moves and the resistance of the positive-electrode active material film 13 can be decreased.

As another positive-electrode material, a metal sulfide or a metal oxide that does not contain lithium such as $TiS_2$, $MoS_2$, $NbSe_2$, or $V_2O_5$; a specific polymer such as polyaniline or a polythiophene; or the like may be used. As a positive-electrode material, the above-described lithium composite oxides, metal sulfides, and metal oxide may be used alone or in combination in the form of a mixture.

Like the positive-electrode collector film 12, the negative-electrode collector film 16 is preferably composed of a material having good chemical stability and electrical conductivity. Such a material is, for example, a metal material such as aluminum, nickel, stainless steel, copper, ITO, platinum, gold, or silver; or the like. As for the negative-electrode collector film 16, a material other than the above-described materials may be used as long as the material has electron conductivity and does not react with the negative-electrode active material film 15.

The negative-electrode active material film 15 is composed of, as a negative-electrode active material, a negative-electrode material that can occlude and release lithium. As the negative-electrode material that can occlude and release lithium, for example, a carbon material that can occlude and release lithium, a composite material between a metal material and a carbon material, a material that can form an alloy with lithium, or the like is used. Specifically, as a carbon material that can occlude and release lithium, there is graphite, non-graphitizable carbon, graphitizable carbon, or the like. More specifically, a carbon material such as a pyrolytic carbon, a coke (pitch coke, needle coke, or petroleum coke), a graphite, a glassy carbon, a burnt substance of an organic polymer compound (substance that is provided by burning a phenolic resin, a furan resin, or the like into carbon at an appropriate temperature), carbon fiber, or activated carbon may be used.

For example, as for graphite or the like, the layers constituting graphite are preferably oriented so as to be perpendicular to the solid-electrolyte film 14. This is because, since lithium is occluded between the layers constituting graphite upon charging of the battery, lithium readily moves and the resistance of the positive-electrode active material film 13 can be decreased.

As a material that can form an alloy with lithium, various metal elements and semimetal elements may be used. Such a material may be an element, an alloy, or a compound, or may have one or more phases of the foregoing in at least a part of the material. Note that, in the present invention, an alloy encompasses an alloy composed of two or more metal elements and also an alloy composed of one or more metal elements and one or more semimetal elements. In addition, an alloy may contain a nonmetal element. Its structure may be a solid solution, a eutectic (eutectic mixture), an intermetallic compound, or a combination of two or more of the foregoing.

As such metal elements and semimetal elements, specifically, there are magnesium (Mg), boron (B), aluminum (Al), gallium (Ga), indium (In), silicon, germanium (Ge), tin (Sn), lead (Pb), bismuth (Bi), cadmium (Cd), silver (Ag), zinc (Zn), hafnium (Hf), zirconium (Zr), yttrium (Y), palladium (Pd), platinum (Pt), and the like.

Of these, as for such elements, a material containing, as a constituent element, a metal element or a semimetal elements in the group 14 in the long form of the periodic table is preferable and, in particular, a material containing at least one of silicon and tin as a constituent element is preferable. This is because silicon and tin have a high capability of occluding and releasing lithium and a high energy density can be achieved. Specifically, for example, there is an element, an alloy, or a compound of silicon; an element, an alloy, or a compound of tin; or a material including one or more phases of the foregoing in at least a part of the material.

In addition, an alloy containing tin (Sn), cobalt (Co), and carbon (C), or the like may be used.

Furthermore, as a material that can occlude and release lithium, a polymer such as polyacethylene or polypyrrole; an oxide such as $SnO_2$; or the like may be used. Then, for the negative-electrode active material film 15, any one of or a mixture of plural of, for example, the above-described negative-electrode materials that can occlude and release lithium can be used as the negative-electrode active material.

The solid-electrolyte film 14 is composed of a material having lithium-ion conductivity and an electron conductivity that is so small and hence negligible. As such a material, for example, there is $Li_3PO_4$, LiPON, NASICON-type $Li_{1+x}M_xTi_{2-x}(PO_4)_3$ (M is another element such as Al or Sc), perovskite-type $La_{2/3-x}Li_{3x}TiO_3$, LISICON-type $Li_{4-x}Ge_{1-x}P_xS_4$, $\beta$-$Fe_2(SO_4)$ type $Li_3M_2(PO_4)_3$ (M is another element such as In or Sc), or the like.

Hereinafter, a method for producing a thin-film lithium-ion battery according to a first embodiment of the present invention will be described. The method for producing a thin-film lithium-ion battery according to the first embodiment of the present invention includes a film-formation step of forming a film of a positive-electrode material to form a positive-electrode active material film; an annealing step of annealing the positive-electrode active material film; after the annealing step, a lithium-ion introduction step of introducing lithium ions into the positive-electrode active material film; and, after the introduction of lithium ions, a reverse-sputtering step of edging the positive-electrode active material film by reverse sputtering.

In thin-film lithium-ion batteries in which positive-electrode active material films are formed by forming the films of positive-electrode materials by sputtering or the like, the utilization efficiency of the positive electrodes is poor. The inventors of the present invention have thoroughly studied the causes of the poor utilization efficiency of a positive electrode and have found the following findings (1) and (2): (1) poor crystallinity of a positive-electrode active material film and (2) a decrease in the amount of lithium in the preparation of a sputtering target and during sputtering.

(Analysis Example)

(1) The degradation of the crystallinity of a positive-electrode active material film will be described. A LiMn2O4 powder was used as a raw material powder. This raw material powder was pressure-sintered by hot pressing and then processed to prepare a sputtering target.

Then, the prepared sputtering target was used to form a positive-electrode active material film on a substrate with a standard sputtering system. The positive-electrode active material film was observed with a transmission electron microscope (TEM). In addition, the raw material powder and the formed positive-electrode active material film were analyzed by X-ray diffraction (XRD).

Figure 2:
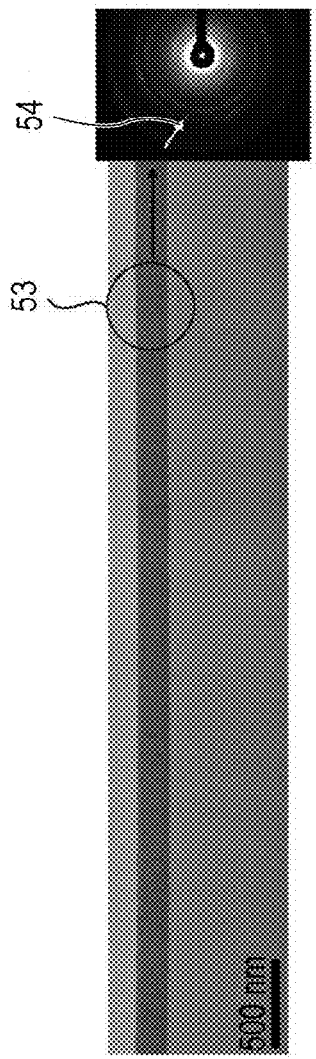
FIGS. 2A and 2B illustrate the TEM image and the electron diffraction pattern of a section of a positive-electrode active material film that had been formed and was to be annealed.
Figure 3:
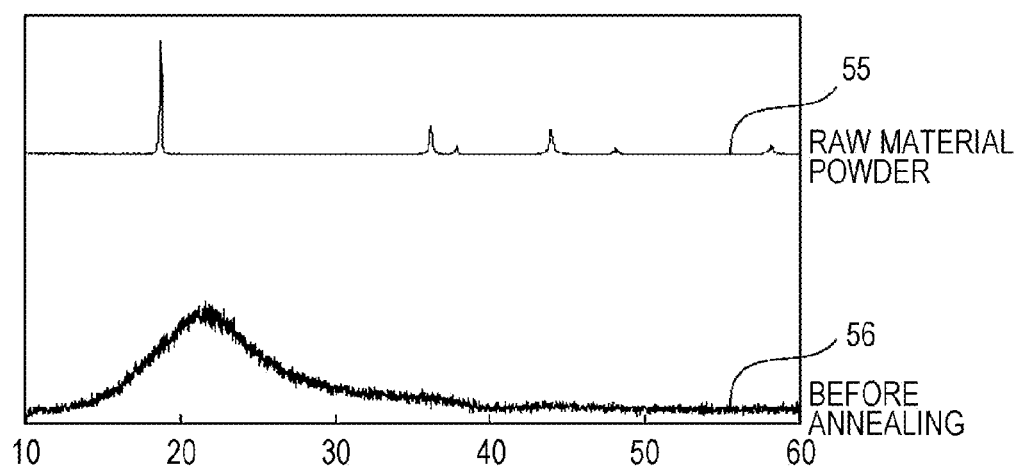
FIG. 3 illustrates the X-ray diffraction pattern of a raw material powder and the X-ray diffraction pattern of a positive-electrode active material film that had been formed and was to be annealed.
Figure 4:
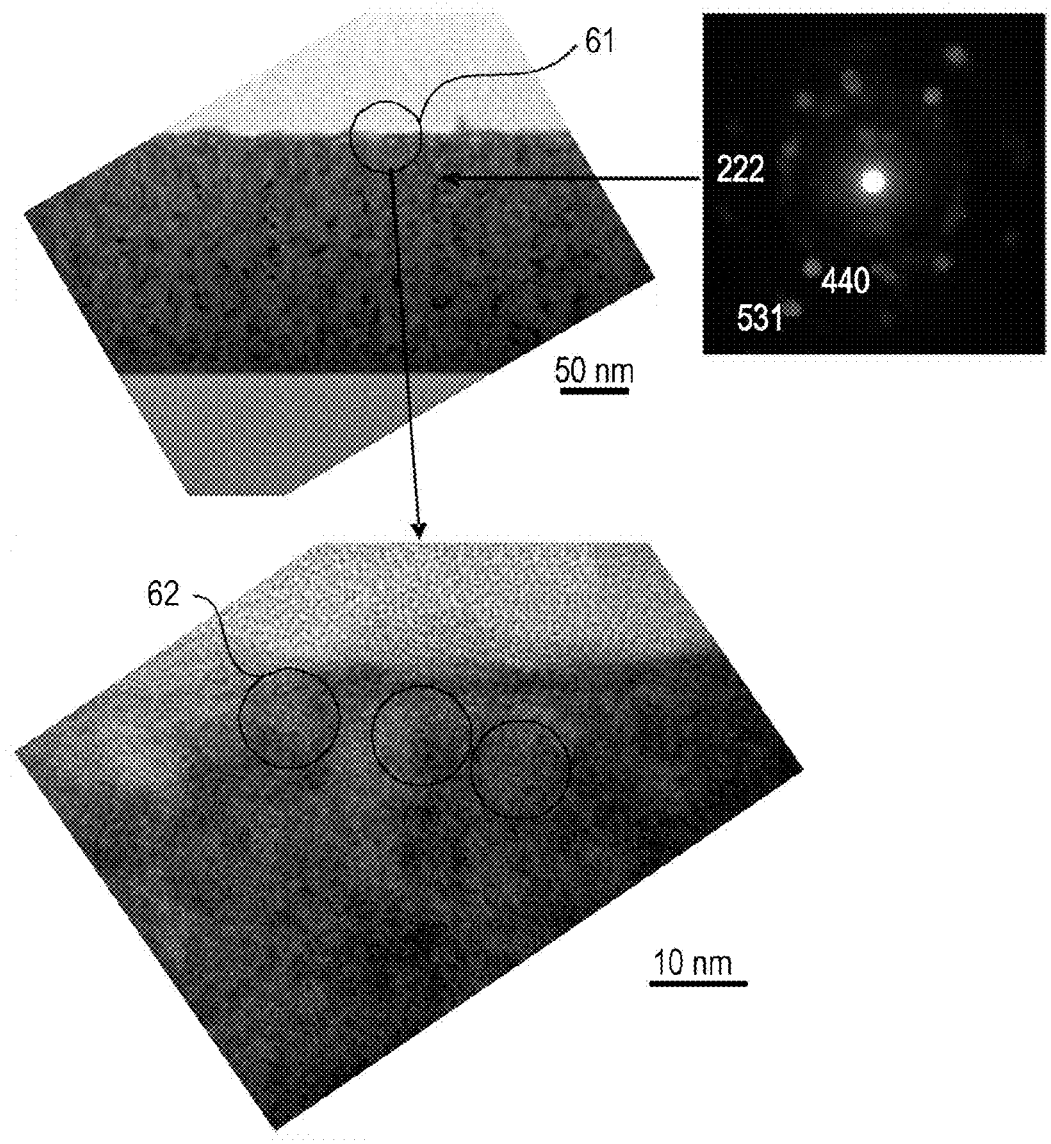
FIGS. 4A to 4C illustrate the TEM images and the electron diffraction pattern of a section of a positive-electrode active material film that had been formed and was to be annealed.

FIGS. 2 to 4 illustrate the results of the observation and analysis. FIG. 2A illustrates the TEM image of a section of the positive-electrode active material film. FIG. 2B illustrates the electron diffraction pattern of a region 53 of the section of the positive-electrode active material. FIG. 3 illustrates the X-ray diffraction pattern of the positive-electrode active material film and the X-ray diffraction pattern of the raw material powder. In FIG. 3, a line 55 indicates the X-ray diffraction pattern of the raw material powder and a line 56 indicates the X-ray diffraction pattern of the positive-electrode active material film. FIG. 4A illustrates the TEM image of a section of the positive-electrode active material film. FIG. 4B illustrates an enlarged TEM image of a region 61 of the positive-electrode active material film. FIG. 4C illustrates the nano-beam diffraction pattern of the region 61.

As illustrated in FIG. 2B, an electron diffraction pattern 52 of the region 53 is a halo ring. As indicated by arrow 54, dots were observed. This is because micro-crystals were present in amorphous. As illustrated in FIG. 3, as for the line 56 of the X-ray diffraction pattern of the positive-electrode active material film, only a halo peak was observed and hence it was confirmed that the crystallinity of the positive-electrode active material film was very poor.

As illustrated in FIG. 4C, in the nano-beam diffraction (NBD), a crystal diffraction spot was observed. A plurality of micro-crystals were overlapped in the direction in which electrons were transmitted and hence it was confirmed that it was not a net pattern. In addition, as illustrated in the TEM image in FIG. 4B, the size of the micro-crystals was estimated at about 10 nm on the basis of the area of a grid pattern observed in a region 62.

(Analysis Example)

(2) The decrease in the amount of lithium in the preparation of a sputtering target will be described.

Figure 5:
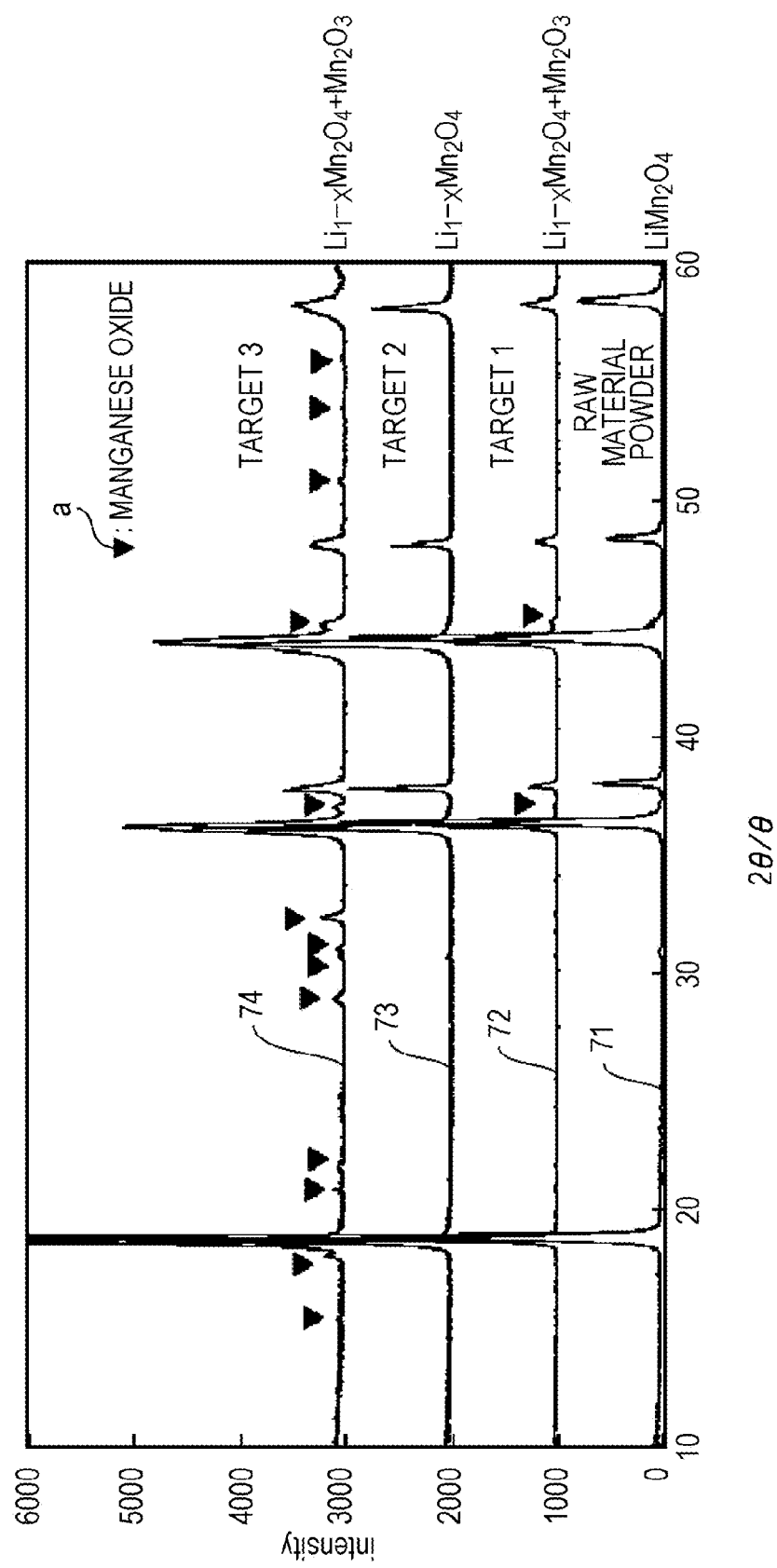
FIG. 5 illustrates the X-ray diffraction pattern of a raw material powder and the X-ray diffraction patterns of sputtering targets.
Figure 6:
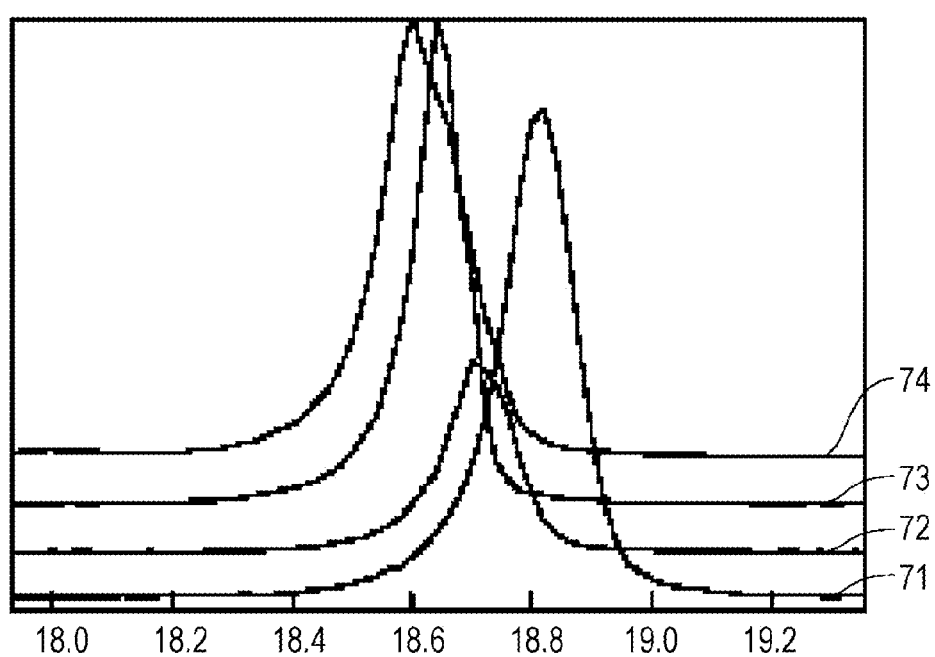
FIG. 6 illustrates the X-ray diffraction pattern of a raw material powder and the X-ray diffraction patterns of sputtering targets.

The $LiMn_2O_4$ powder was used as a raw material powder and three sputtering targets (Target 1 to Target 3) were prepared by hot pressing under different temperature conditions or different pressure conditions. The prepared sputtering targets and the $LiMn_2O_4$ powder serving as the raw material powder were analyzed by X-ray diffraction. FIG. 5 illustrates the X-ray diffraction patterns of the $LiMn_2O_4$ powder and the sputtering targets. FIG. 6 illustrates an enlarged view of the X-ray diffraction patterns of the $LiMn_2O_4$ powder and the sputtering targets in the neighborhood of $2\theta=18.0°$ to $19.2°$.

In FIGS. 5 and 6, a line 71 indicates the X-ray diffraction pattern of the raw material powder. A line 72 indicates the X-ray diffraction pattern of the Target 1. A line 73 indicates the X-ray diffraction pattern of the Target 2. A line 74 indicates the X-ray diffraction pattern of the Target 3.

In FIG. 5, as illustrated in the X-ray diffraction pattern of the line 72, the diffraction peaks of manganese oxide ($Mn_2O_3$) appeared at the position indicated by arrow a. As illustrated in the X-ray diffraction pattern of the line 74, the diffraction peaks of manganese oxide ($Mn_2O_3$) appeared at the position indicated by arrow a. In FIG. 6, the diffraction peaks of the line 72, the line 73, and the line 74 appeared at positions deviated from the position of the diffraction peak of the line 71 appearing in the neighborhood of $2\theta=18.8°$.

Thus, it has been found that the amount of lithium decreases in sputtering targets prepared from raw material powder by loss of lithium from $LiMn_2O_4$ serving as the raw material powder in the preparation of the targets or by the formation of a mixture of $Li_{1-x}Mn_2O_4$ and $Mn_2O_3$ due to the decomposition of a portion of $LiMn_2O_4$.

In addition, since lithium evaporates during sputtering, the amount of lithium in a positive-electrode active material film further decreases.

The above-described (1) and (2) are causes that degrade the utilization efficiency of a positive electrode. Thus, by overcoming the (1) and (2), the utilization efficiency of a positive electrode can be enhanced. Hereinafter, steps of the method for producing a thin-film lithium-ion battery according to the first embodiment will be described with reference to drawings.

(Film-Formation Step)

FIGS. 7A to 7E are schematic diagrams for illustrating the method for producing a thin-film lithium-ion battery according to the first embodiment. As illustrated in FIG. 7A, a thin film serving as a positive-electrode collector film 82 is formed on a substrate 81 and a thin film serving as a positive-electrode active material film 83 is formed on the positive-electrode collector film 82. These thin films may be formed by, for example, a vapor-phase method such as a physical vapor deposition (PVD) method or a chemical vapor deposition (CVD) method; a liquid-phase method such as electroplating, electroless plating, or an application method (a sol-gel process or a CSD method); or a solid-phase method such as Langmuir-Blodgett (LB) method.

As the PVD method, for example, there is a vacuum deposition method, an electron beam method, a laser ablation method, a molecular beam epitaxy (MBE) method, an MOMBE method, a reactive deposition method, an ion plating method, an ionized cluster beam method, a glow-discharge sputtering method, an ion-beam sputtering method, a reactive sputtering method, or the like.

As the CVD method, for example, there is a thermal CVD method, a metal organic chemical vapor deposition (MOCVD) method, an RF plasma CVD method, a photo CVD method, a laser CVD method, a liquid phase epitaxy (LPE) method, or the like.

For example, the thin films may be prepared with sputtering targets formed from materials serving as raw materials of the thin films by, for example, a dc magnetron sputtering method or the like. As a gas in sputtering for forming the thin films, for example, argon (Ar) may be used.

(Annealing Step)

Then, as illustrated in FIG. 7B, the positive-electrode active material film 83 is annealed. The annealing is performed with, for example, a standard annealing furnace, and, for example, in the air at 300° C. to 1000° C., or in a vacuum at 100° C. to 1000° C., or in an oxygen atmosphere or an inert gas atmosphere such as nitrogen gas or argon gas at a temperature appropriately selected. The annealing may be performed with, for example, laser light such as excimer laser light or lamp light emitted from an infrared lamp.

(Lithium-Ion Introduction Step)

As illustrated in FIG. 7C, a stack in which the positive-electrode collector film 82 and the positive-electrode active material film 83 are sequentially stacked on the substrate 81 and a lithium metal plate 84 are connected to a power supply 85 and are placed in an electrolytic solution 86 such that the positive-electrode active material film 83 faces the lithium metal plate 84. Then, a predetermined voltage is applied and lithium ions 87 are introduced into the positive-electrode active material film 83 in the discharging process. The electrolytic solution is, for example, an organic electrolytic solution in which a lithium salt is dissolved in an organic solvent. As the organic solvent and the lithium salt, solvents and lithium salts that are usually used for lithium-ion secondary batteries may be used.

(Reverse-Sputtering Step)

As illustrated in FIG. 7D, after the lithium-ion introduction step, to make the surface of the positive-electrode active material film 83 be clean, the surface of the positive-electrode active material film is subjected to edging by reverse-sputtering. After that, washing with an organic solvent or the like, UV-ozone radiation, or the like is further performed to clean the surface.

(Film-Formation Step of Solid-Electrolyte Film etc.)

Then, a solid-electrolyte film 88 is formed on the positive-electrode active material film 83. A negative-electrode active material film 89 is formed on the solid-electrolyte film 88. A negative-electrode collector film 90 is formed on the negative-electrode active material film 89. The solid-electrolyte film 88, the negative-electrode active material film 89, and the negative-electrode collector film 90 may be formed by a film-formation method similar to that for the positive-electrode active material film 83. Note that the orientation of the solid-electrolyte film 88 and the negative-electrode active material film 89 is preferably controlled so as to be in a direction in which lithium ions readily flow. Thus, a thin-film lithium-ion battery is provided.

In the above-described method for producing a thin-film lithium-ion battery according to the first embodiment, the state of the positive-electrode active material film 83 varies in steps as described below. FIGS. 8A to 8C schematically illustrate variation in the state of the positive-electrode active material film 83 in steps of the method for producing a thin-film lithium-ion battery.

FIG. 8A schematically illustrates the state of the positive-electrode active material film 83 to be annealed after the positive-electrode active material film 83 is formed from a raw material powder that is, for example, $LiMn_2O_4$ serving as a positive-electrode material. As illustrated in FIG. 8A, the positive-electrode active material film 83 to be annealed has a state in which $Li_{1-x}Mn_2O_4$ micro-crystals are present in amorphous Li, Mn, and O. FIG. 8B schematically illustrates the state of the positive-electrode active material film 83 after the positive-electrode active material film 83 is annealed. As illustrated in FIG. 8B, by performing the annealing, the state in which the crystallinity of the positive-electrode active material film 83 has been enhanced is provided. FIG. 8C schematically illustrates the state of the positive-electrode active material film 83 after the lithium-ion introduction step. As illustrated in FIG. 8C, lithium has been introduced into the $Li_{1-x}Mn_2O_4$ crystals to provide $LiMn_2O_4$ crystals.

(Analysis Example)

The enhancement of crystallinity by annealing the positive-electrode active material film 83 has been confirmed by analysis described below. Hereinafter, an example in which the positive-electrode active material film 83 that had been formed and was to be annealed and the positive-electrode active material film 83 that had been annealed were analyzed will be described.

A $LiMn_2O_4$ powder was used as a raw material powder. This raw material powder was pressure-sintered by hot pressing and then processed to prepare a sputtering target. This sputtering target was used to form a positive-electrode active material film on a substrate with a standard sputtering system. The positive-electrode active material film was observed with a transmission electron microscope (TEM) and analyzed by X-ray diffraction.

In addition, the positive-electrode active material film was annealed. The annealing was performed with a standard annealing furnace in the air atmosphere at a temperature condition of 600° C. for 6 hours. After the annealing was performed, the positive-electrode active material film was observed with a transmission electron microscope (TEM) and analyzed by X-ray diffraction. Furthermore, the $LiMn_2O_4$ powder serving as the raw material powder was analyzed by X-ray diffraction.

Figure 9:
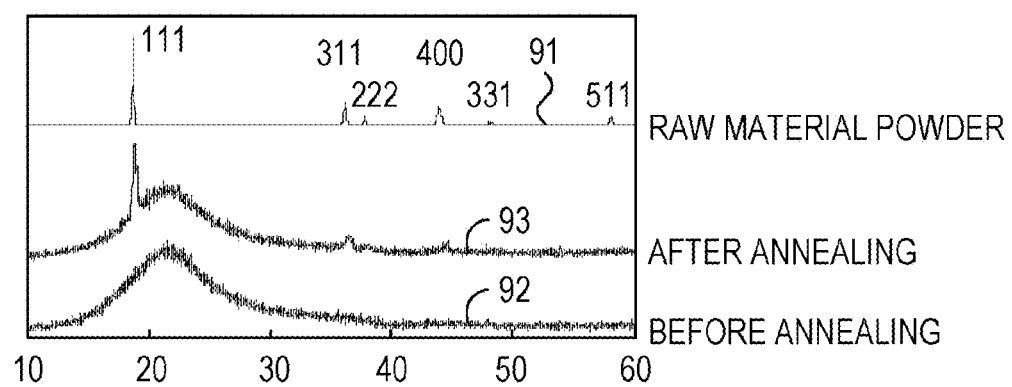
FIG. 9 illustrates the X-ray diffraction pattern of a raw material powder, the X-ray diffraction pattern of a positive-electrode active material film that had been formed and was to be annealed, and the X-ray diffraction pattern of the positive-electrode active material film that had been annealed.

FIG. 9 illustrates the X-ray diffraction pattern of the positive-electrode active material film that had been formed and was to be annealed, the X-ray diffraction pattern of the positive-electrode active material film that had been annealed, and the X-ray diffraction pattern of the $LiMn_2O_4$ powder serving as the raw material powder. In FIG. 9, a line 91 indicates the X-ray diffraction pattern of the raw material powder. A line 92 indicates the X-ray diffraction pattern of the positive-electrode active material film that had been formed and was to be annealed. A line 93 indicates the X-ray diffraction pattern of the positive-electrode active material film that had been annealed.

FIGS. 10A to 10D illustrate TEM images and electron diffraction patterns observed with a transmission electron microscope. FIG. 10A illustrates the TEM image of a section of the positive-electrode active material film that was to be annealed after the formation of the positive-electrode active material film. FIG. 10B illustrates the electron diffraction pattern of a region 94. FIG. 10C illustrates the TEM image of a section of the positive-electrode active material film that had been annealed. FIG. 10D illustrates the electron diffraction pattern of a region 95.

As illustrated in FIG. 9, in the line 92 of the X-ray diffraction pattern of the positive-electrode active material film to be annealed, only a halo peak was observed. In addition, as illustrated in FIG. 10B, the electron diffraction pattern is a halo ring. As indicated by arrow 96, dots were observed. Thus, it was confirmed that the positive-electrode active material film 83 that had been formed and was to be annealed was in a state in which $Li_{1-x}Mn_2O_4$ micro-crystals were present in amorphous state.

As for the line 93 of the X-ray diffraction pattern of the positive-electrode active material film that had been annealed, the diffraction peak illustrated in FIG. 9 appeared. In addition, as illustrated in FIG. 10D, a large number of dots were observed in the electron diffraction pattern. That is, it was confirmed that the positive-electrode active material film that had been annealed had enhanced crystallinity, compared with the state of the positive-electrode active material film that was immediately after the film formation.

In addition, as described below, positive-electrode active material films that had been annealed under different two temperature conditions were analyzed by X-ray diffraction. First, a $LiMn_2O_4$ powder was used as a raw material powder. This raw material powder was pressure-sintered by hot pressing and then processed to prepare a sputtering target. This sputtering target was used to form a positive-electrode active material film with a standard sputtering system. After that, the positive-electrode active material film was annealed with a standard annealing furnace by being aged in the air atmosphere at 350° C. for 6 hours. In addition, a positive-electrode active material film that was formed in the same manner as that described above was annealed with a standard annealing furnace by being aged in the air atmosphere at 600° C. for 6 hours. The raw material powder, the positive-electrode active material film that had been formed and was to be annealed, and the positive-electrode active material film that had been annealed were examined by X-ray diffraction.

Figure 11:
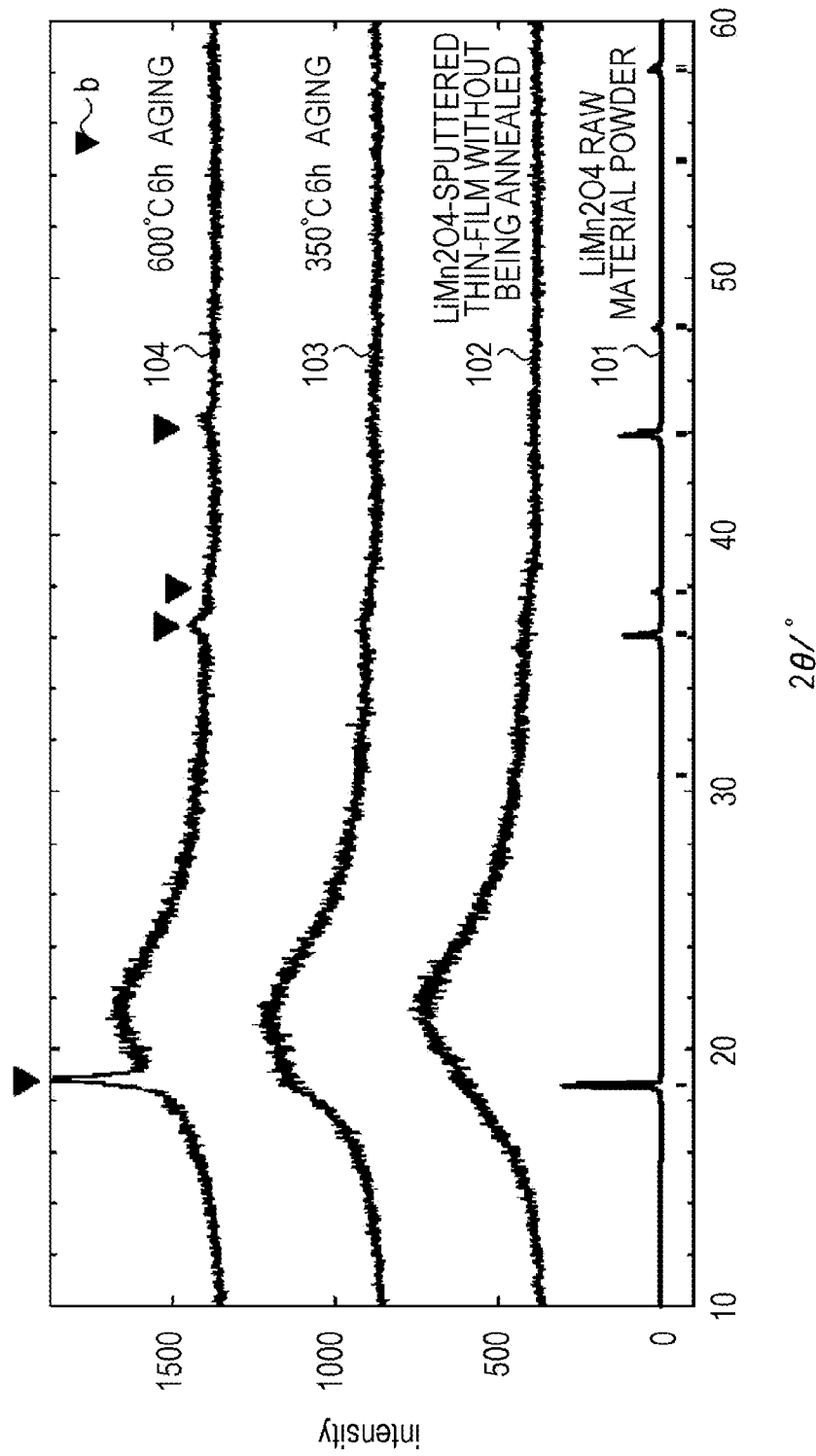
FIG. 11 illustrates the X-ray diffraction pattern of a raw material powder, the X-ray diffraction pattern of a positive-electrode active material film that had been formed and was to be annealed, and the X-ray diffraction patterns of positive-electrode active material films that had been annealed.

FIG. 11 illustrates X-ray diffraction patterns. In FIG. 11, a line 101 indicates the X-ray diffraction pattern of the $Li_2MnO_4$ serving as the raw material powder. A line 102 indicates the X-ray diffraction pattern of the positive-electrode active material film that had been formed and was to be annealed. A line 103 indicates the X-ray diffraction pattern of the positive-electrode active material film that had been annealed by being aged at 350° C. for 6 hours after sputtering. A line 104 indicates the X-ray diffraction pattern of the positive-electrode active material film that had been annealed by being aged at 600° C. for 6 hours after sputtering. In the line 104, diffraction peaks appeared at the positions indicated by arrow b and the proceeding of crystallization was confirmed.

According to the method for producing a battery according to the first embodiment, a positive-electrode active material film is annealed to enhance the crystallinity and, as a result, the utilization efficiency of the positive electrode can be enhanced. In addition, by supplying lithium in the lithium-ion introduction step, the utilization efficiency of the positive electrode can be enhanced.

Hereinafter, a method for producing a battery according to a second embodiment will be described. The method for producing a battery according to the second embodiment is characterized by including a film-formation step of forming a film of a positive-electrode material under heating of a substrate to form a positive-electrode active material film; after the film-formation step, a lithium-ion introduction step of introducing lithium ions into the positive-electrode active material film; and, after the lithium-ion introduction step, a reverse-sputtering step of subjecting the positive-electrode active material film to reverse sputtering.

(Film-Formation Step)

A single-crystal substrate is used. While this substrate is heated, for example, a laser ablation method, a sputtering method, or the like is performed to form a positive-electrode collector film that is a highly oriented crystal film on the substrate. By using a single-crystal substrate, epitaxial growth can be achieved and the orientation of the positive-electrode collector film can be enhanced.

Then, while the substrate is heated, for example, a laser ablation method, a sputtering method, or the like is performed on the positive-electrode collector film to form a positive-electrode active material film that is a highly oriented crystal film on the positive-electrode collector film. The substrate temperature in the film formation is, for example, 100° C. to 1000° C. When a lithium composite oxide having a layered structure is used, the layers constituting the lithium composite oxide are preferably oriented so as to be perpendicular to the surface of the positive-electrode collector film because lithium ions readily flow.

(Lithium-Ion Introduction Step and Reverse-Sputtering Step)

As in the first embodiment, the lithium-ion introduction step is performed and the reverse-sputtering step is performed. Note that, since the lithium-ion introduction step and the reverse-sputtering step are the same as in the first embodiment, detailed descriptions are omitted.

(Film-formation Step of Solid-Electrolyte Film etc.)

Then, a solid-electrolyte film is formed on the positive-electrode active material film. A negative-electrode active material film is formed on the solid-electrolyte film. A negative-electrode collector film is formed on the negative-electrode active material film. Note that the orientation of the negative-electrode active material film and the solid-electrolyte film is preferably controlled so as to be in a direction in which lithium ions readily flow. Thus, a thin-film lithium-ion secondary battery is provided.

Since the method for producing a battery according to the second embodiment includes the step of forming a film of a positive-electrode material under heating of a substrate, the crystallinity of the positive-electrode active material film can be enhanced and the utilization efficiency of the positive electrode can be enhanced. In addition, by supplying lithium in the lithium-ion introduction step, the utilization efficiency of the positive electrode can be enhanced. Furthermore, the crystallinity of the positive-electrode active material film can be enhanced at a relatively low temperature.

Hereinafter, a method for producing a battery according to a third embodiment will be described. The method for producing a battery according to the third embodiment is characterized by including a film-formation step of forming a film of a positive-electrode material under the application of a magnetic field to form a positive-electrode active material film; a lithium-ion introduction step of introducing lithium ions into the positive-electrode active material film; and, after the lithium-ion introduction step, a reverse-sputtering step of subjecting the positive-electrode active material film to reverse sputtering.

(Film-Formation Step)

A single-crystal substrate is used. While a magnetic field is applied between a target and the substrate, for example, a laser ablation method, a sputtering method, or the like is performed to form a positive-electrode collector film that is a highly oriented crystal film on the substrate.

Then, while a magnetic field is applied between a target and the substrate, for example, a laser ablation method, a sputtering method, or the like is performed to form a film of a positive-electrode material on the positive-electrode collector film, to thereby form a positive-electrode active material film that is a highly oriented crystal film on the positive-electrode collector film. The magnetic field is applied by, for example, arranging magnets around the target and the substrate. When a lithium composite oxide having a layered structure is used as the positive-electrode material, the layers constituting the lithium composite oxide are preferably oriented so as to be perpendicular to the surface of the substrate because lithium ions readily flow.

(Lithium-ion Introduction Step and Reverse-Sputtering Step)

As in the first embodiment, the lithium-ion introduction step is performed and the reverse-sputtering step is performed. Note that, since the lithium-ion introduction step and the reverse-sputtering step are the same as in the first embodiment, detailed descriptions are omitted.

Then, by a like film-formation method, a solid-electrolyte film is formed on the positive-electrode active material film; a negative-electrode active material film is formed on the solid-electrolyte film; and a negative-electrode collector film is formed on the negative-electrode active material film. Note that the orientation of the negative-electrode active material film and the solid-electrolyte film is preferably controlled so as to be in a direction in which lithium ions readily flow. Thus, a thin-film lithium-ion battery is provided.

Since the method for producing a battery according to the third embodiment includes the step of forming a film of a positive-electrode material under the application of a magnetic field between a target and a substrate, the crystallinity of a positive-electrode active material film can be enhanced and the utilization efficiency of the positive electrode can be enhanced. In addition, by supplying lithium in the lithium-ion introduction step, the utilization efficiency of the positive electrode can be enhanced. Furthermore, the crystallinity of the positive-electrode active material film can be enhanced at a low temperature.

The structure of thin-film lithium-ion batteries to which the methods for producing a thin-film battery according to the first to third embodiments can be applied is not restricted to the above-described examples. For example, the applications can be made to, for example, thin-film lithium-ion batteries having a structure in which a substrate is composed of a conductive material and a positive-electrode battery collector is omitted. In the third embodiment, the application of a magnetic field is performed during the formation of a film of a positive-electrode material. However, the application of electrolysis, the application of high frequency, the application of ICP, or the like may be performed.

The present invention provides the advantage of enhancing the utilization efficiency of a positive electrode.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

EXPLANATION OF REFERENCE NUMERALS 11 substrate
12 positive-electrode collector film
13 positive-electrode active material film
14 solid-electrolyte film
15 negative-electrode active material film 16 negative-electrode collector film
81 substrate
82 positive-electrode collector film
83 positive-electrode active material film
84 lithium metal plate
85 power supply
86 electrolytic solution
87 lithium ions
88 solid-electrolyte film
89 negative-electrode active material film
90 negative-electrode collector film

The invention claimed is:

1. A method for producing a positive electrode of a thin-film battery comprising:
   a film-formation step of forming a positive-electrode active material film layer on a substrate, the positive-electrode active material film layer including a positive electrode material that includes an amount of amorphous lithium and an amount of $Li_{1-x}$ based microcrystals, where x is an amount of lithium to be added to the microcrystals;
   after the film-formation step, an annealing step of annealing the positive-electrode active material film layer, thereby increasing the amount of $Li_{1-x}$ based microcrystals and reducing the amount of amorphous lithium; and
   after the annealing step, a lithium-ion introduction step of introducing lithium ions into the $Li_{1-x}$ based microcrystals of the positive-electrode active material film layer by placing the positive-electrode active material film layer and a lithium source in an electrolytic solution, and applying a voltage to effect a transfer of the lithium ions from the lithium source to the positive-electrode active material film layer to convert the $Li_{1-x}$ based microcrystals to $Li_1$ based micro crystals; and
   after the lithium-ion introduction step, a reverse-sputtering step of subjecting the positive-electrode active material film layer to reverse sputtering.

2. The method for producing a positive electrode of a thin-film battery according to claim 1, wherein
   the positive-electrode material contains a lithium composite oxide containing lithium and a transition metal.

3. The method for producing a positive electrode of a thin-film battery according to claim 1, wherein the positive-electrode material contains a lithium composite oxide having a Spinel structure.

4. The method for producing a positive electrode of a thin-film battery according to claim 1, wherein, in the annealing step, annealing is performed in air at 300° C. to 1000° C.

5. The method for producing a positive electrode of a thin-film battery according to claim 1, wherein, in the annealing step, annealing is performed in a vacuum at 100° C. to 1000° C.

* * * * *